Sept. 12, 1933.  P. N. SUTTON  1,926,069
OXYGEN CONTROLLING APPARATUS
Filed April 7, 1932
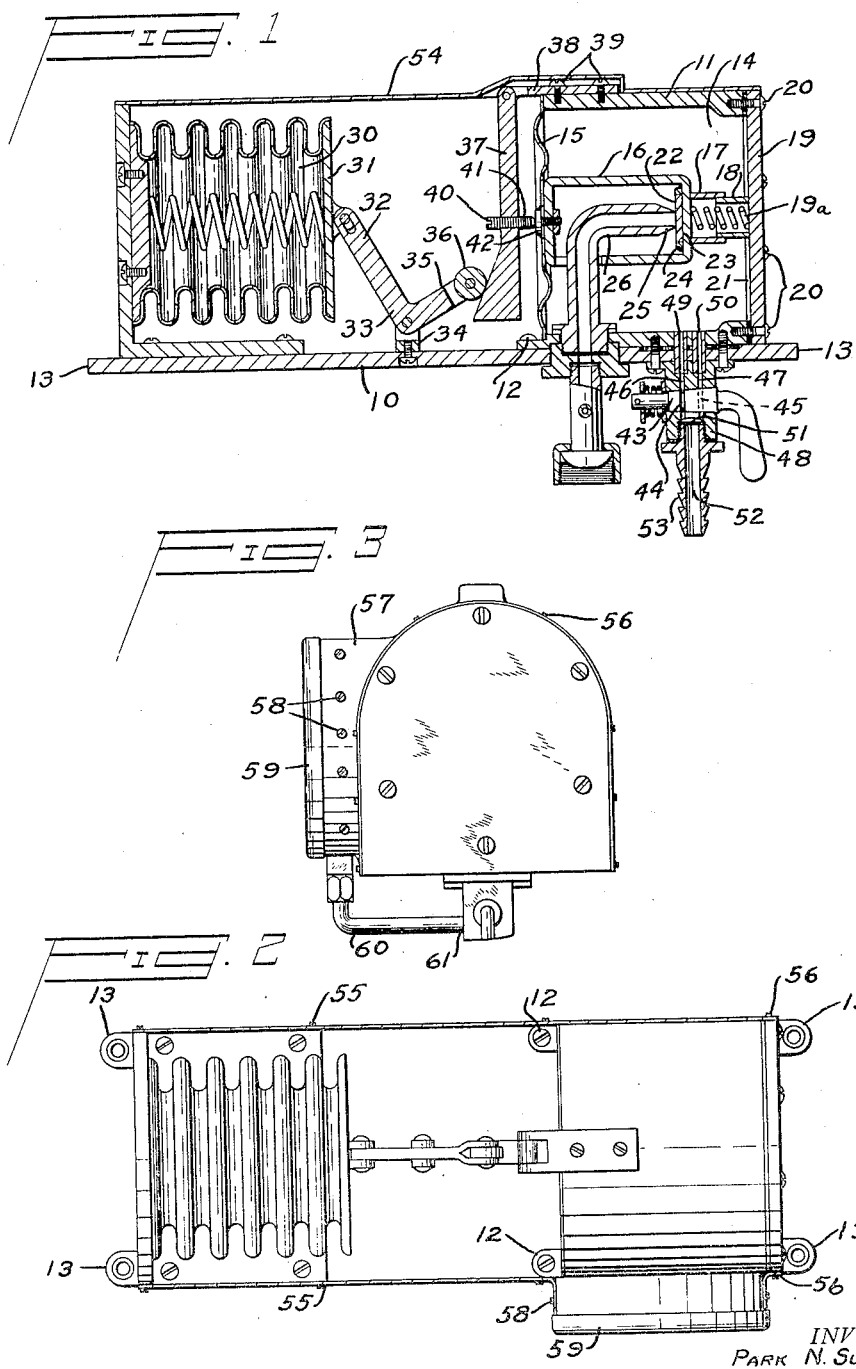
INVENTOR
PARK N. SUTTON.
BY Francis J. Vanderworker
and Clade Koontz
ATTORNEYS Patented Sept. 12, 1933

1,926,069

UNITED STATES PATENT OFFICE 1,926,069

OXYGEN CONTROLLING APPARATUS

Park N. Sutton, Dayton, Ohio

Application April 7, 1932. Serial No. 603,836

3 Claims. (Cl. 137—153)

(Granted under the Act of March 3, 1883, as amended April 30, 1928; 370 O. G. 757)

The invention described herein may be manufactured and used by or for the Government for governmental purposes, without the payment to me of any royalty thereon.

The present invention relates generally to apparatus for supplying oxygen to aviators and has for its principal object to provide an apparatus which will operate automatically to deliver oxygen to a face mask of an aviator in the proper volume to supply the deficiency in the atmosphere at any altitude to which he may ascend, the volume of oxygen supply being appropriately varied automatically as he rises or descends so that he may at all times breath normally regardless of his altitude.

Several forms of apparatus have heretofore been devised for supplying oxygen to aviators, the general characteristics of such apparatus being the use of a high-pressure tank containing a supply of oxygen, which essentially is under pressure of 2000 pounds per square inch, the oxygen being delivered from the tank through a reducing valve intended to reduce the pressure to about 16 pounds per square inch. From this reducing valve the oxygen is supplied to an aviator's gas mask through a valve having an orifice of variable area controlled by an aneroid arranged to enlarge the orifice by the expansion of the aneroid at higher altitudes so as to increase the supply of oxygen delivered to the aviator. Such apparatus has been found to be unsatisfactory in operation for several reasons, which need not be herein enumerated, but chiefly because of the complicated valve arrangements for controlling the flow of oxygen, which are necessary. For example, such an apparatus incorporated needle valves having jewel seats. Under actual service conditions a proper seating of this type of valve has been found difficult to maintain inasmuch as dirt particles or other foreign substances easily keep the valve from seating properly. In the type of apparatus being considered the valve is usually actuated by a flexible diaphragm having connection with the aneroid and past experience has taught that the apparatus requires a stiffened diaphragm in order to effect proper seating of the valve, which same is objectionable in that the functioning of the diaphragm is delayed when the critical altitude is reached. Such apparatus is further objectionable in that jewelled seats are not only expensive but difficult to maintain when being used under actual service conditions, their repair and maintenance requiring the services of skilled mechanics at all times.

An object of the present invention, therefore, is to provide certain improvements in apparatus of this type to meet the exacting conditions encountered in providing an apparatus suitable for aeronautical use.

A further object of the present invention is to provide a highly sensitive and simple mechanism which promptly responds to changes in atmospheric pressure, further characterized by having a minimum of moving parts, the proper maintenance of which will not require the services of an artisan in making repairs, which latter is especially important when instruments of this type are used under actual service conditions.

With these and other objects in view, which may be incident to my description, the invention consists in the parts and combinations to be hereinafter set forth and claimed, it being understood that the several necessary elements comprising my invention may be varied in construction, proportion and arrangement of parts without departing from the spirit and scope of the appended claims.

In order to make my invention more clearly understood I have shown in the accompanying drawing means for carrying the same into practical effect without limiting the improvements in their useful applications to the particular constructions which, for the purpose of explanation, have been made the subject of illustration.

In the drawing:

Fig. 1 is substantially a central, longitudinal, vertical cross-section of my improved apparatus;

Fig. 2 is a top plan view thereof; and

Fig. 3 is an end view of Fig. 2.

Referring more particularly to the drawing wherein corresponding parts are indicated by like numerals throughout the several views thereof, the apparatus in the preferred embodiment of my invention herein illustrated comprises generally a base plate 10 and a casing or housing 11, which fits upon the base plate and is secured thereto by screws 12 or other suitable means. The base plate may be provided with lugs 13 by which the apparatus may be mounted upon any suitable support, as shown in Figs. 1 and 2.

Referring more particularly to Fig. 1 in which the several operating parts of the apparatus are shown in their assembled relation on the base plate, the casing 11 is shown as being provided with a pressure chamber 14, a flexible diaphragm 15 forming one wall of said chamber as viewed at the left-hand side of the casing, as shown in Fig. 1, thus forming a closed chamber for receiving fluid under pressure.

A yoke 16 is mounted centrally of diaphragm 15, the opposite free end of which is provided with a guide 17, which telescopically slides on a tubular bearing number 18, fixedly secured to the inner face of the rear wall 19 of the casing. To make for ease of assembly or disassembly of the parts of the apparatus the rear wall is shown as being removably mounted on the said casing 11 by means of machine screws 20, a gasket 21 of any suitable material being interposed between the inner face of the rear wall and the outer face of the casing, as shown in Fig. 1, to render the pressure chamber leak-proof. A valve seat 22 of hard rubber or other similar material is mounted on the inner face 23 of the free end of the yoke 16 by means of the retaining ring 24, which is brazed or otherwise suitably secured to the face 23 of the yoke, the said valve seat being adapted to normally seat against a valve cone 25 provided on the end of an L-shaped inlet conduit 26 having connection with a main pressure tank (not shown) for admitting pressure into the pressure chamber. As shown in Fig. 1, the yoke 16 is slotted as indicated by numeral 27 to permit movement of the yoke relative to the conduit, this also assisting in properly seating the valve seat on the cone 25. As shown in Fig. 1, a valve seat restraining spring 19a, bearing at its one end against the valve seat and at its other end against the rear wall of the casing, is housed within the valve guide 17 and bearing 18 adapted for normally urging the valve seat against the valve cone 25.

An L-shaped bracket 28 secured to the opposite end of the base plate 10 by means of machine screws 29 carries an evacuated sylphon 30, the free end 31 of which is pivotally connected to one arm 32 of a bell-crank lever 33, which is shown pivotally mounted on a bracket member 34 carried by the base plate 10. The other arm 35 of the bell-crank lever is provided with a roller 36 which is adapted to bear against the cam-faced free end of a lever 37 pivotally mounted on an extended arm 38 secured to the top of a casing 11 by screws 39. The lever 37 is provided with internal threads, as shown in Fig. 1, within which is adapted to be adjustably screwed a set screw 40 bearing at its inner end 41 against a reinforcing disc 42 provided on the outer face of the diaphragm 15 aforementioned. In this manner lost motion occurring between the roller 36, the lever 37 and the disc 42 may be overcome.

Numeral 43 indicates a manually operated valve which is provided with an annular relieved portion 44 and a central opening 45 having communication with passages 46 and 47 respectively formed in the body portion 48 of the said valve. At their inner ends these passages communicate with outlets 49 and 50, provided in the lower end of the casing 11. The lower ends of the passages 46 and 47 terminate in a common outlet 51 having communication with an outlet 52 provided in a nozzle 53 screwed into the lower end of the body portion of the valve, the said nozzle being adapted for connection with the face mask of an aviator.

A housing 54, secured to the base 10 and casing 11 by screws 55 and 56, is provided with a recessed portion 57 within which may be mounted, as by machine screws 58, a high pressure gauge 59. A conduit 60 connects at its one end to the gauge 59 and at its other end communicates with the inlet conduit 26, as shown by numeral 61 in Fig. 3. In this manner the pressure gauge indicates the pressure remaining in the supply tank heretofore mentioned.

The operation of the apparatus is automatic and is as follows: At sea level when high pressure oxygen up to 2250 pounds per square inch is connected to the high pressure conduit 26, no flow of oxygen passes from the apparatus due to the fact that the valve seat restraining spring 19a holds the valve seat against the valve cone permitting no oxygen to flow into the pressure chamber. When the atmospheric pressure on the apparatus is reduced as is the case is ascending to a higher altitude the evacuated sylphon 30 starts to expand due to the differential in pressures. As the sylphon expands it moves the arm 35 of the bell-crank lever 33 against the lever 37, which in turn through screw 40 presses against the diaphragm disc 42 to move the diaphragm to the right as viewed in Fig. 1. As the center of the diaphragm is moved it causes the yoke 16 to press against its restraining spring 19a and when sufficient pressure is exerted the valve seat 22 moves away from the valve cone 25 and permits oxygen to pass from the high pressure conduit 26 into the pressure chamber 14 and out through outlet 46, which, as will be noted by referring to Fig. 1, is always open. Too great a pressure is prevented from being built up in the pressure chamber 14 by reason of the fact that when the pressure reaches a critical point it acts on the inner face of the diaphragm, tends to force it to the left against the pressure being exerted thereon by the bell-crank lever and thus tends to press the valve seat 22 against the valve cone 25, thus reducing the flow of oxygen coming into the chamber. The pressure which will be built up in the pressure chamber 14 is governed by the size orifice in the valve cone 25 and the strength of the restraining spring 19a. The greater the reduction in atmospheric pressure on the sylphon or, in other words, the higher the altitude, the greater will be the flow of oxygen passing through the apparatus. In case a greater flow of oxygen than that coming from the outlet 46 is desired, this same may be accomplished by rotating the valve 43 into the position indicated in Fig. 1 so that the opening 45 registers with the outlet opening 47 at which time the volume of oxygen passing from the pressure chamber will be practically doubled.

It will be understood, of course, that while the apparatus shown and described is intended primarily for supplying oxygen to aviators, it may also be used for supplying other gases than oxygen in situations where such gases are required to be supplied and therefore the use of the term oxygen is not intended as a limitation of the invention, but is intended to comprehend the use of other gases as well. Also while the apparatus described is primarily intended to function through variations in atmospheric pressure due to changes in altitude, my invention is not limited to use only in the manner and for the purpose specifically described. It may be used in other situations and for any purpose for which it is suitable. The claims hereinafter made should therefore be construed accordingly.

What I claim as my invention and desire to secure by Letters Patent is:

1. In a device of the character described, means for supplying fluid at a substantially constant pressure, a casing having a chamber for receiving said fluid under pressure and having a port for delivering the same, a flexible diaphragm forming one wall of said chamber, a yoke type valve carried by said diaphragm for controlling the admission of said fluid into said chamber, a pivoted lever provided with a cam-shaped portion carried by said casing, the free end portion of said lever being in engagement with said diaphragm, a sylphon, and a bell-crank lever pivotally connected to said sylphon at its one free end and having its other free end bearing against the cam-shaped portion of said first-mentioned lever for applying external pressure to said diaphragm to open said valve.

2. In a device of the character described, means for supplying fluid at a substantially constant pressure, a casing having a chamber for receiving said fluid under pressure and having a port for delivering the same, a flexible diaphragm forming one wall of said chamber, a yoke type valve carried by said diaphragm for controlling the admission of said fluid into said chamber, a pivoted lever depending from said casing, the free end of said pivoted lever being provided with a cam-shaped portion, an adjustable screw threaded member mounted in said lever adjacent its cam-shaped portion adapted to bear against said diaphragm, a sylphon, and a bell-crank pivotally connected with said sylphon at its one free end and having its other free end bearing against the cam-shaped end portion of said first-mentioned lever for applying external pressure to said diaphragm to open said valve.

3. In a device of the character described, means for supplying fluid at a substantially constant pressure, a casing having a chamber for receiving said fluid under pressure and having a port for delivering the same, a flexible diaphragm forming one wall of said chamber, a yoke type valve carried by said diaphragm for controlling the admission of said fluid into said chamber, a pivoted lever depending from said casing, the free end of said pivoted lever being provided with a cam-shaped portion, an adjustable screw threaded member mounted in said lever adjacent its cam-shaped portion adapted to bear against said diaphragm, a sylphon, and a bell-crank lever pivotally connected with said sylphon at its one free end and having a roller pivoting on its other free end adapted to roll on the cam-shaped portion of said first-mentioned lever for applying external pressure to said diaphragm to open said valve.

PARK N. SUTTON.